United States Patent [19]

Allen et al.

[11] Patent Number: 5,059,748
[45] Date of Patent: Oct. 22, 1991

[54] CABLE SPLICE ENCLOSURE

[75] Inventors: Barry Allen, Siler City; Mark Harvell, Lillington; Christopher Hastings, Garner; Luis Puigcerver, Fuquay-Varina; Gloria J. Marik, Raleigh, all of N.C.

[73] Assignee: Raychem Corporation, Menlo Park, Calif.

[21] Appl. No.: 515,004

[22] Filed: Apr. 26, 1990

[51] Int. Cl.⁵ ............................................. H02G 7/20
[52] U.S. Cl. ........................................ 174/87; 174/93
[58] Field of Search ........................ 174/87, 91, 93, 44

[56] References Cited

U.S. PATENT DOCUMENTS

| | | | |
|---|---|---|---|
| 292,848 | 2/1884 | Patterson | 174/44 |
| 1,204,412 | 11/1916 | Cook | 174/44 |
| 1,446,598 | 2/1923 | Turner | 174/44 |
| 3,557,299 | 1/1971 | Dienes | 174/38 |
| 3,728,467 | 4/1973 | Klayum et al. | 174/38 |
| 3,848,074 | 11/1974 | Channell | 174/77 R X |
| 3,919,460 | 11/1975 | Neail et al. | 174/87 |
| 4,467,137 | 8/1984 | Paget et al. | 174/87 |
| 4,692,565 | 9/1987 | Koht et al. | 174/93 X |
| 4,701,574 | 10/1987 | Shimirak et al. | 174/77 R X |
| 4,880,676 | 11/1989 | Puigcerver et al. | 174/77 R X |
| 4,902,855 | 2/1990 | Smith | 174/93 |

*Primary Examiner*—Morris H. Nimmo
*Attorney, Agent, or Firm*—Herbert G. Burkard; William D. Zahrt, II; A. Stephen Zavell

[57] ABSTRACT

A re-enterable butt cable splice closure comprising a base and domed cover. The base has various parts that hinge together around cables, and has a gel sealing material defining cable entry ports which gel is put under compression when the parts of the bases are brought together. The base is supported on a support that has guides that align the cables with the ports.

21 Claims, 4 Drawing Sheets

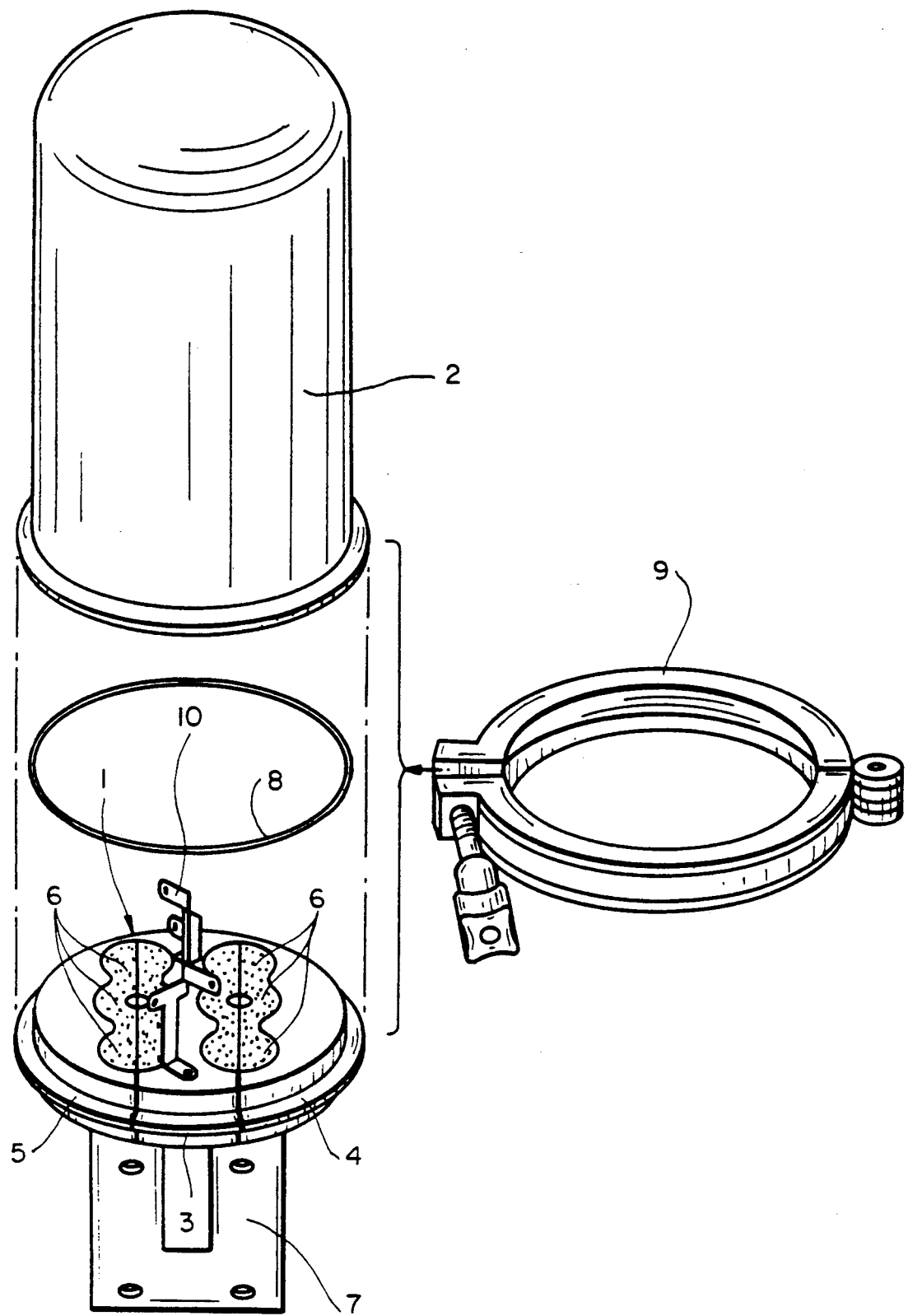

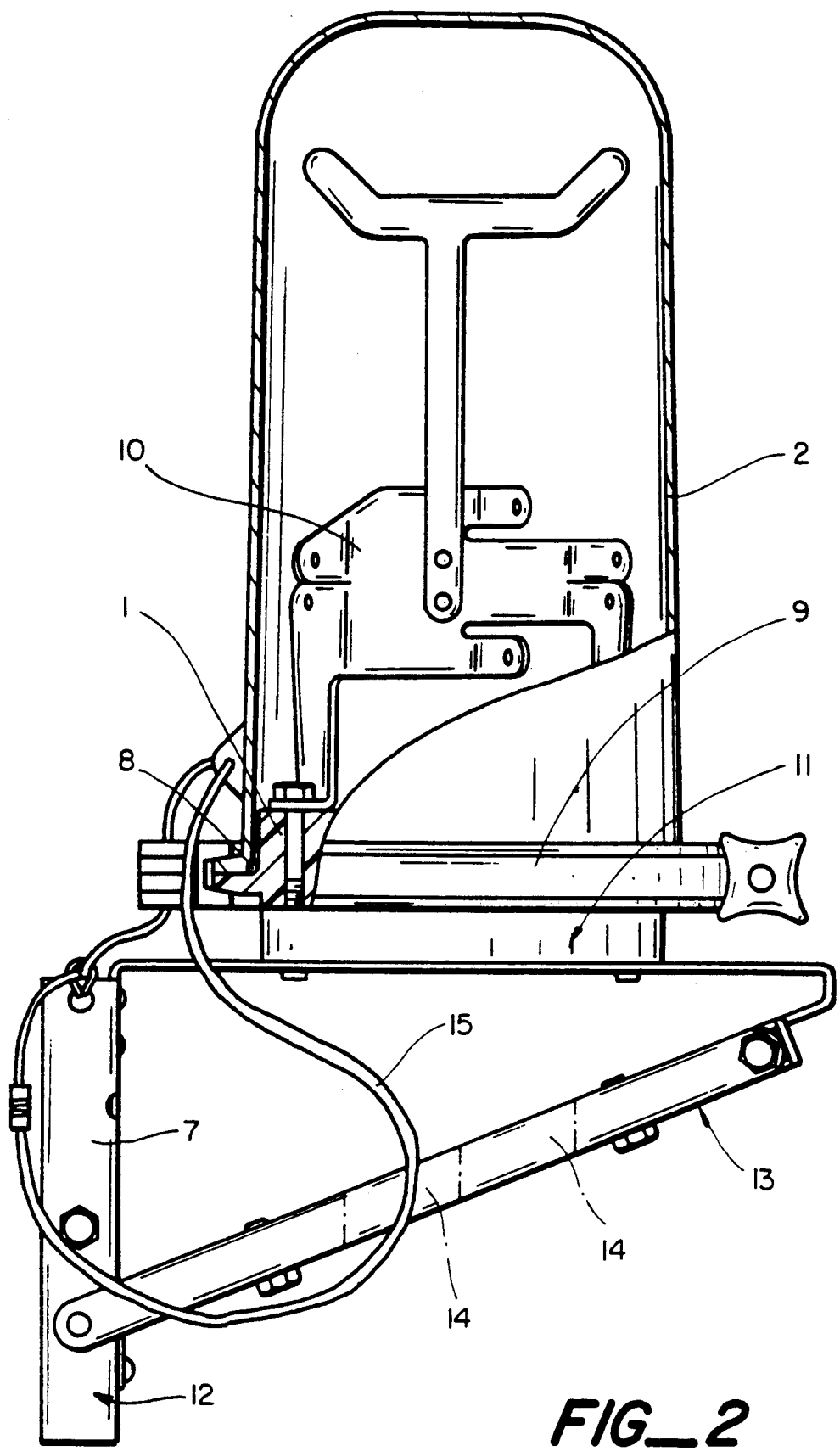
FIG_2

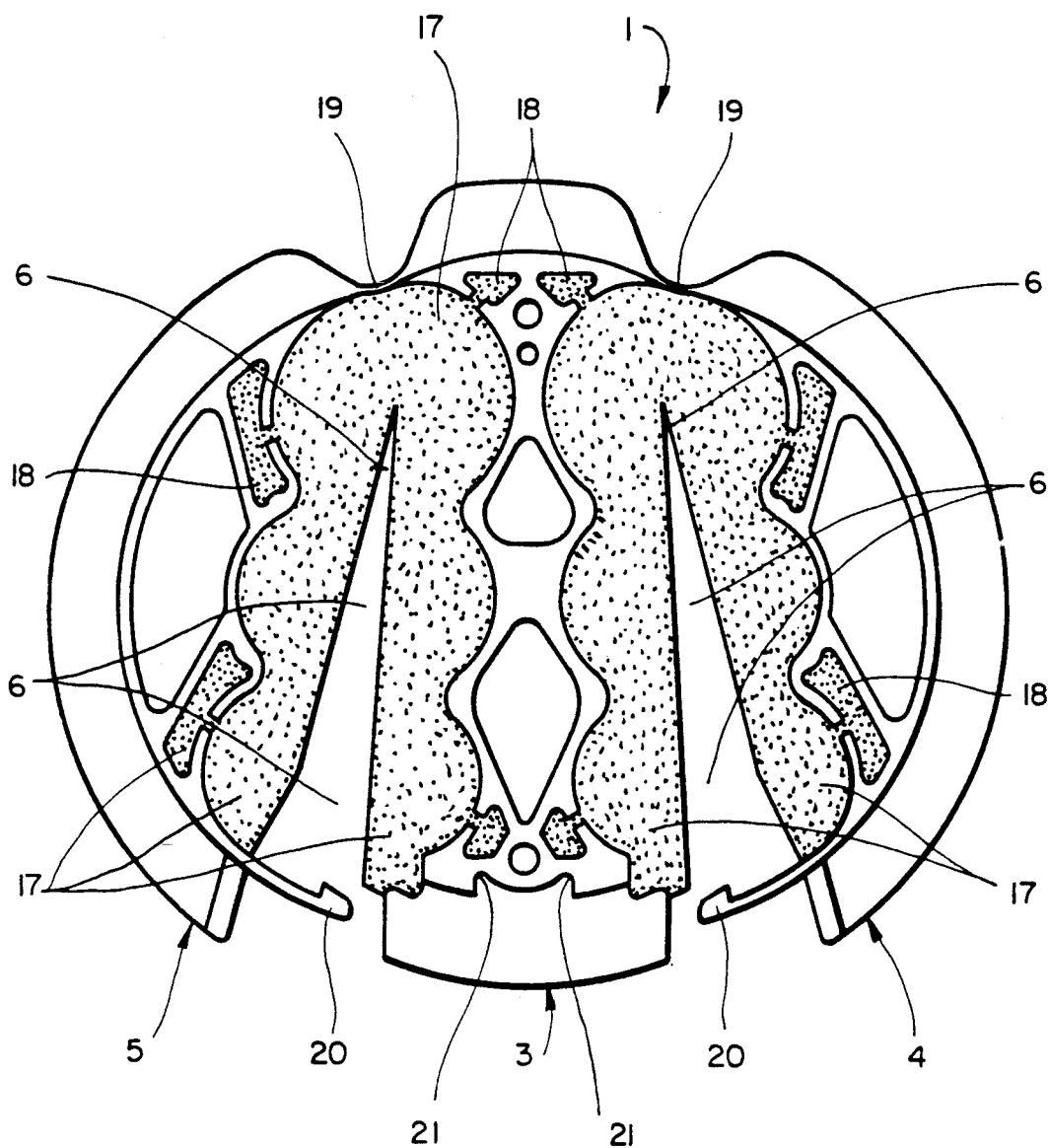
FIG_3

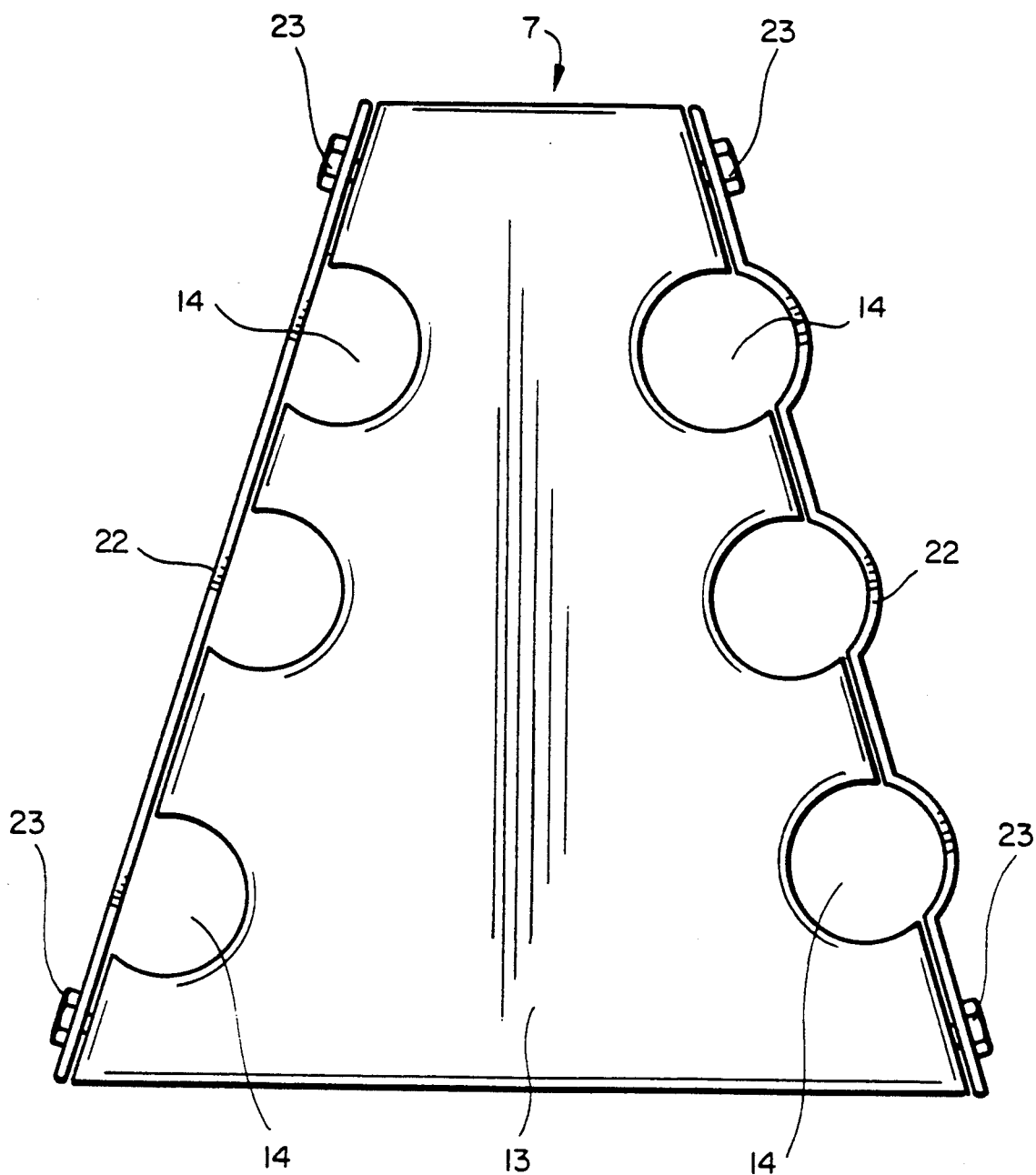
FIG_4

CABLE SPLICE ENCLOSURE

FIELD OF INVENTION

This invention relates to environmental sealing of splices in or between cables, in particular telecommunications cables, particularly distribution cables, for example where drop-wires are spliced into a distribution cable or where two distribution cables are joined together.

BACKGROUND TO THE INVENTION

If a telecommunications service is to remain reliable over a long period all conductors and connectors must be protected from the environment, particularly from moisture. A problem therefore arises where cables are spliced together or where drop wires are spliced into a cable, since the conductors must be exposed in order to make the desired electrical connections. Any cable jacket or insulation removed for this purpose must therefore be made good after the electrical connections have been made. Analogous problems arise in the case of optical fibre cables, and the present invention applies to them also.

In general, telecommunications cable splices are protected from the environment by building around them a so-called splice case or splice enclosure. The design of such an enclosure will depend upon the nature of the cables or drop wires to be spliced, on the severity of the environment and on the position of the splice in the telecommunications network. In the present case we are particularly, although not exclusively, concerned with a closure for butt splices in the aerial distribution network that can readily be re-entered, and that can be installed without special tools, particularly without a source of heat (as is required for widely used heat-shrinkable enclosures and enclosures employing hot-melt adhesives).

Various prior art splice enclosures will now be referred to. In each case a butt splice is enclosed by an enclosure comprising a base and a dome-like cover.

EP 0094848 (Raychem) discloses an enclosure suitable as a telecommunications radial distribution point comprising a base having at least three passages and a cover which fits over one side of the base. The passages are provided with at least one tubular recoverable outlet on one side of the base and at least one tubular recoverable outlet on the other side of the base. Reference may also be made to GB 2104313 (Raychem).

U.S. Pat. No. 3,728,467 (Klayum et al) discloses a buried-type ready-access splice closure comprising a dielectric base with a pair of openings for receiving the opposite runs of a loop of cable. The base is split along a parting region that passes through the centres of the openings. The base also has clamping means for clamping the runs of cable and for grounding the shield of the cable outside of the base. The loop of cable has its coverings stripped away to expose the insulated core wires for splicing to service (ie-drop) wires. The loop is supported by a bracket that is attached to the base and to the clamping means, and the loop and bracket are enclosed by a cover that is removably clamped to the base.

U.S. Pat. No. 3,557,299 (Dienes) discloses a device for making tap connections to continuous cable wherein a loop of the cable, with insulated conductors exposed for connection, is brought through a tightly fitting rubbery sleeve into a connection area which is thereafter hermetically sealed. Clamps are provided which support the cable rigidly in position with respect to a base and an elastic sleeve which fits into an opening in the base. A dome-shaped cover is fitted over the base.

U.S. Pat. No. 3,848,074 (Channell) discloses a terminal and splice enclosure for cables, including an annular terminal base on which is threaded a cover, a resilient sealing and locking band secures the cover on the base. The base has a tapered opening which receives a tapered grommet having variable size holes through which the cables pass in sealed relationship.

Two instances of prior art in-line, rather than butt, splice closures will be mentioned in view of the cable end seals that are disclosed.

U.S. Pat. No. 4,701,574 (Shimirak et al.) discloses a cable end seal, and a closure which includes the cable end seal, the end seal providing a barrier against water. First and second end seals are disposed adjacent opposite sides of a cable splice, and placed in compression around the cable, the end seals having outer convoluted surfaces which mate with a variable length convoluted tubing bridging member so as to form an environmental closure for the splice. The end seals are split and have an axial bore to allow passage of a cable therethrough. Preferably the end seals comprise a gel having an open loop network such that it is elastic, conformable and has a cone penetration preferably between 80 and 350 ($10^{-1}$ mm) and an ultimate elongation in excess of 50%, the gel being contained within a member having a plurality of convolutions therearound. Attention is also directed to U.S. Pat. No. 4,880,676 (Puigcerver et al) which also discloses cable splice case end seals. Here a gel is used having a cone penetration value from 50 to 200 ($10^{-1}$ mm) and an ultimate elongation of at least 50% and it is provided in a casing that at least partially surrounds the gel and that has an external circumferentially-extending convolution. The casing has an aperture, through the thickness thereof through which the gel extends to contact circumferentially-extending gel at an external surface of the case.

PCT GB 8901336 (Raychem) discloses a method of environmentally protecting an elongate substrate, such as a cable splice, with a cover and a sealing means having an elongation of at least 100% and a compression set at 70° C. of less than 30% which comprises positioning the sealing means around a portion of the substrate and surrounding the substrate with the cover such that the sealing material provides a seal between the cover and the substrate. The sealing means may comprise a sealing material such as a gel in substantially rigid parts that are held together by means such as screws. The parts are separable and together define holes through which the substrates to be sealed will pass. Also disclosed is a device that may be secured to a sealing means to provide an enclosure with mechanical strength for example axial-pull strength or with electrical earth continuity. Armour or other strength member of the cables to be spliced may be secured to a flange or other part of the device by securing means such as a bolt.

BRIEF DESCRIPTION OF THE INVENTION

We have now devised a cable splice enclosure that, at least in preferred embodiments, is easily re-enterable and re-sealable without the use of special tools, that can allow for cable addition and relocation of cables, can eliminate moisture and/or insect ingress, that can provide mechanical splice protection and electrical bonding to cable sheaths, and that can provide mechanical attachment to telephone poles or other vertical surfaces.

Thus, the present invention provides a closure for a cable splice which comprises:

(a) a base comprising first, second and third parts the second and third parts being adjacent to and hinged to the first part (preferably at different positions on the first part, and preferably by means of living hinges that are connected to or are integral with the first part and the second and third parts), such that respective cable ports extending from one side of the base to another are defined between respectively the first and second parts and the first and third parts;

(b) a cover, which is preferably blind at one end and is preferably substantially dome-shaped, and which together with the base defines an enclosed space for the cable splice; and (c) a support for the base attached to the first part and which preferably has guides for locating cables in alignment with the ports, the guides preferably allowing lateral insertion of cables thereinto, preferably having means for prevention of lateral removal therefrom, and preferably being outside of the closed space and separated from the ports by at least 1 inch, more preferably by at least 2 inches.

DETAILED DESCRIPTION OF THE INVENTION

It may be desirable that the closure be mounted adjacent a substantially vertical surface with the base (which will generally comprise a substantially flat plate) substantially horizontal and the cover extending vertically above it. To this end, the support may have a first part that is attached to the first part of the base and have means for attachment to a vertical surface, the first part of the support and the means for attachment being oriented relative to one another such that the base is substantially horizontal when the support is attached to a vertical surface by the means for attachment.

In one embodiment this may be achieved by the support comprising a first part that can be attached to the first part of the base and that can be aligned substantially horizontally, a second part that comprises means for attachment to a vertical surface and that can be aligned substantially vertically, and a third part that extends obliquely between the first and second parts and that has guides for locating cables in alignment with the ports. The first, second and third parts of the support may be attached to one another directly or indirectly or they may be integral.

The third part of the support may comprise an elongate member having holes therethrough, preferably in the form of recesses in each of its opposing longitudinal edges, the cables being receivable in the holes or recesses, of which there are preferably 2-10, more preferably 2,4,6,8 or 10 spaced along the length of the elongate member. In the case of recesses the cables will be able to be laterally insertable therein, and means is preferably provided to prevent (under the stresses encountered in usual service) subsequent lateral removal. Such means may comprise one or more further elongate members such as metal or plastics strips, optionally shaped to accommodate part of the circumference of a cable, that may be attached to the sides of the elongate member.

The second and third parts of the base can preferably each be hinged relative to the first part of the base between a first configuration where at least one of the ports is open in cross-section, and a second configuration where that port is closed in cross-section. Thus, the cables can be inserted laterally into the ports when they are open in cross-section (avoiding the need for access to a free end of the cable), and the parts of the base then hinged together closing the cross-section of the ports, thus trapping the cables and, if appreprate, forming an environmental seal around them. When the parts of the base are thus hinged together they preferably then (and preferably only then) have a configuration corresponding to that of the cover. The cover is then placed over the base and some means such as an O-ring and circular clamp applied to hold them together. That or other means may serve also to hold the parts of the base together in compressive fashion.

A sealing material, preferably one that does not require heat-activation and preferably a gel or a mastic, may be provided for sealing a cable within one of the ports. That sealing material is preferably subjected to a compressive force, and means such as those referred to above, may be provided for this purpose. In particular, the sealing material is preferably provided between the first and second parts and/or between the first and third parts, and means for subjecting is preferably provided comprising a clamp for holding the second and third parts hinged towards the first part. In the absence of a cable, each port may have only a nominal existence since a sealing material may at least partially fill any hole that the cable is to occupy. In this case the sealing material is displaced on insertion of the cable or on bringing together of the parts of the base.

The first, second and third parts may comprise substantially rigid members and the base may additionally comprise a sealing material positioned between surfaces of the first and second parts and surfaces of the first and third parts that face one another. At least one of the substantially rigid members may have a hole therein into which the sealing material may extend thereby locking the sealing material adjacent at least one of said surfaces. The hole may have a wide portion remote from the surface and a narrow portion adjacent the surface so the sealing material becomes keyed into the hole.

The sealing material preferably comprises a gel, which may be cross-linked or otherwise cured. It preferably has a cone penetration value of from 50-200, preferably 50-100, ($10^{-1}$ mm) and an ultimate elongation of at least 50%, preferably at least 100%, especially at least 200%. Cone penetration values are determined in accordance with ASTM D217-68 on an undisturbed sample at 70° F. using a standard 1:1 scale cone, of cone weight 102.5 g and shaft weight of 47.5 g, the penetration being measured after 5 seconds. Ultimate elongation values are determined in accordance with ASTM D638-80 at 70° F., using a type 4 die to cut the sample and at a speed of 50 cm/minutes. Two or more sealing materials may be used together, for example a harder material may (at least) partially enclose a softer material.

The gel may comprise, for example, urethane, silicone or non-silicone liquid rubber with low or no unsaturation prior to cross-linking which is then cross-linked. We prefer, however, that the gel comprise a block copolymer extended with a mineral or other oil. Preferred block copolymers include styrene (ethylene-butylene) styrene block copolymers, or others comprising styrene and blocks comprising ethylene and/or one or more other ethylenic monomers. A particularly preferred material comprises that marketed under the trademark Kraton.

Strain relief is preferably provided so that the base takes the weight of the cables directly to some substantially rigid portion thereof, as opposed to the weight being taken by any environmental seal, such as a gel or other sealing material, provided by the ports. We prefer therefore that a surface of the base opposite to that to which the support is attached (preferably therefore inside the closed space) has a bonding harness thereon. This may be of a floating type which allows some cable movement and which employs a rigid mounting attached to the base (preferably to the first part thereof) and braided or other straps that connects bond clamps on the cables to the mounting. Alternatively, it may be of a rigid type in which the mounting has lugs or other parts that connect directly to the bond clamps. In this way the cables are mechanically secured to the base and may be electrically grounded to one another, (for ground continuity for example) to the closure or the other ground connection.

BRIEF DESCRIPTION OF THE DRAWINGS

FIG. 1 is an exploded view of a closure according to the invention;

FIG. 2 is a side elevation in partial cross-section of a closure according to the invention;

FIG. 3 is a plan view of a base for use as part of a closure according to the invention; and FIG. 4 is a plan view of a support for use as part of a closure according to the invention.

DETAILED DESCRIPTION OF THE INVENTION

FIG. 1 shows a closure comprising a base 1 and a cover 2 which together with the base 1 defines an enclosed space for a cable splice. The base comprises first, second and third parts 3,4,5, that are hinged together such that respective cable ports 6 are defined, the ports extending from one side of the base to another. Cables thus enter the space defined by the base and cover through the ports 6. The base is provided with a support, by means of which the closure can be attached to a surface, preferably a vertical surface such as that of a telephone pole.

The base 1 and cover 2 may be attached and sealed together by any suitable means, such as the O-ring 8 and circular clamp 9 illustrated. A bonding harness 10 is shown provided on the base, preferably on the side opposite to that of the support 7, ie that side which will be inside the sealed closure.

In FIG. 2, the support can be seen to comprise a first part 11 that is attached to the base 1, preferably to the first part 3 of the base (see FIG. 1), a second part 12 that comprises means for attachment to a vertical surface, and a third part 13 of the base preferably has guides 14 for locating cables in alignment with the parts 6 (see FIG. 1). A connection means such as a wire or cable or other lead 15 is preferably provided between the cover and the base or support to retain the cover if it is dropped when the enclosure is re-entered.

The base 1 is shown in more detail in FIG. 3. It can be seen to comprise a first part 3, a second part 4 and a third part 5. Ports 6 are defined between the first part 3 and each of the second and third parts 4,5. Each part may comprise a substantially rigid casing, housing or other member 16 and a sealing material such as a gel 17. The sealing material may extend into a hole 18 thereby locking the sealing material adjacent a surface of the first second or third parts of a substantially rigid casing etc. thereof. The holes 18 can be seen to have a widened portion remote from the surfaces covered by the gel, and a narrow portion adjacent the surfaces so the sealing material is keyed into the holes.

The parts of the base are joined together, preferably by means of one or more living hinges 19, and preferably by two such hinges that are spaced apart. When the parts of the base are brought together around cables that are positioned in the ports 6 the gel or other sealing material is preferably put under compression, thereby forming a good environmental seal. The parts of the base may be held together, and the compression on the sealing material maintained by a suitable means for providing compression, such as a clamp or clasp 20,21.

A support is shown in FIG. 4, being for example the part 13 of FIG. 2. It can be seen to comprise an elongate member having guides 14 spaced along its length. The guides may comprise holes of open or closed cross-section. Preferably, as illustrated, the guides 14 are open in cross-section so that cables may be inserted laterally into them. In this way access to an end of the cables is not required. The cables may be retained in the guides by means of an elongate member such as a metal or plastics or other strip 22, removably secured by fixing means such as nut and bolt 23. The guides may be any suitable shape and may be such that the cables are a snap-fit therein. The strip 22 may be shaped for conformance with the cables as shown on the right-hand side of the figure. The guides 14 on the support are aligned with the ports 6 in the base. In general this alignment will mean that the guides follow a pattern that is congruent with that of the ports, but if the cables diverge (or converge) from the base the patterns of guides and ports may be, for example, geometrically similar rather than congruent. The alignment thus provided of the cables in the ports allows an excellent gel seal to be maintained since the gel need not be excessively stressed in any direction.

For the avoidance of doubt it is noted that the invention provides a new cable splice closure that is preferably re-enterable and preferably can be installed without the use of special tools. Any one or more of the disclosed features of base or support may be selected.

We claim:
1. A closure for a cable splice which comprises:
    (a) a base comprising first, second and third parts, the second and third parts being adjacent to and hinged to the first part, and respective cable ports extending from one side of the base to another between respectively the first and second parts and the first and third parts;
    (b) a cover for use together with the base for defining an enclosed space for the cable splice; and
    (c) a support for the base attached to the first part.
2. A closure according to claim 1, in which the support has guides for locating cables in alignment with the ports.
3. A closure according to claim 2, in which the guides allow lateral insertion of cables thereinto, and have means for prevention of lateral removal therefrom.
4. A closure according to claim 1, in which the support has a first part that is attached to the first part of the base, and has means for attachment to a vertical surface, the first part of the support and the means for attachment being oriented relative to one another such that the base is substantially horizontal when the support is attached to a vertical surface by the means for attachment.

5. A closure according to claim 1, in which the support comprises a first part that can be attached to the first part of the base and that can be aligned substantially horizontally, a second part that comprises means for attachment to a vertical surface, that can be aligned substantially vertically, and a third part that extends obliquely between the first and second parts and that has guides for locating cables in alignment with the ports.

6. A closure according to claim 1, in which the cover is blind at one end.

7. A closure according to claim 1, in which a surface of the base opposite to that to which the support is attached has a bonding harness thereon.

8. A closure according to claim 1, in which the base comprises a sealing material.

9. A closure according to claim 8, in which the sealing material comprises a gel.

10. A closure according to claim 8, in which the sealing material has a cone penetration value between 50 and 200 ($10^{-1}$ mm) and an ultimate elongation of at least 50%.

11. A closure according to claim 1, in which the sealing material comprises a block-copolymer extended with an oil.

12. A closure according to claim 11, in which the block copolymer comprises styrene blocks and blocks comprising ethylene and/or one or more other ethylenic monomers.

13. A closure according to claim 1, in which the second and third parts of the base can each be hinged relative to the first part of the base between a first configuration where at least one of the ports is open in cross-section, and a second configuration where that port is closed in cross-section.

14. A closure according to claim 1, in which the first, second and third parts of the base comprise substantially rigid members, and in which the base additionally comprises a sealing material positioned between surfaces of the first and second parts and surfaces of the first and third parts that face one another.

15. A closure according to claim 14, in which at least one of the substantially rigid members has a hole therein into which the sealing material extends thereby locking the sealing material adjacent at least one of said surfaces.

16. A closure according to claim 1, in which the second and third parts of the base are hinged to the first part at different positions on the first part.

17. A closure according to claim 1, in which the first part is hinged to the second and/or third part of the base by means of a living hinge.

18. A closure according to claim 2, in which the guides are separated from the ports by at least 1 inch.

19. A closure according to claim 2, in which the guides are positioned outside of the closed space.

20. A closure according to claim 1, which additionally comprises a sealing material for sealing a cable within one of said ports, and means for subjecting the sealing material to a compressive force.

21. A closure according to claim 20, in which the sealing material is provided between the first and second parts and/or between the first and third parts, and said means for subjecting comprising a clamp for holding the second and third parts hinged towards the first part.

* * * * *